United States Patent [19]
Schoen et al.

[11] Patent Number: 6,028,551
[45] Date of Patent: Feb. 22, 2000

[54] MICRO-MINIATURE BEACON TRANSMIT-ONLY GEO-LOCATION EMERGENCY SYSTEM FOR PERSONAL SECURITY

[76] Inventors: Neil Charles Schoen; Wendy Ann Schoen, both of 9817 Freestate Pl., Gaithersburg, Md. 20879

[21] Appl. No.: 09/052,066

[22] Filed: Apr. 6, 1998

Related U.S. Application Data

[63] Continuation-in-part of application No. 08/904,377, Aug. 1, 1997, abandoned, which is a continuation of application No. 08/355,901, Dec. 13, 1994, abandoned.

[51] Int. Cl.[7] .............................. H04B 7/185; G01S 5/02
[52] U.S. Cl. .............................. 342/357.16; 342/357.05; 342/357.09; 342/357.1
[58] Field of Search ..................... 342/357.05, 357.16, 342/357.01, 357.09, 357.1, 357.07

[56] References Cited

U.S. PATENT DOCUMENTS

| | | | |
|---|---|---|---|
| 5,111,209 | 5/1992 | Toriyama | 342/457 |
| 5,202,829 | 4/1993 | Geier | 342/457 |
| 5,392,052 | 2/1995 | Eberwine . | |
| 5,629,707 | 5/1997 | Heuvel et al. . | |
| 5,748,147 | 5/1998 | Bickley et al. | 342/457 |
| 5,786,789 | 7/1998 | Janky | 342/419 |

*Primary Examiner*—Theodore M. Blum

[57] ABSTRACT

Novel transmit-only geo-location techniques which can operate synergistically with existing or newly designed satellite or ground-based wireless communications networks using micro-miniature emergency geo-location beacons to provide personal security are described. A combination of physical measurement parameters (Doppler shifts and/or time intervals obtained from clock or signal correlation data) allows geo-location with a reduced number of satellite or wireless receive nodes, thus reducing the cost or increasing the coverage of the system as compared to current geo-location systems. In addition, several of these techniques allow geo-location to be performed on optical and infra-red radiation sources, which can enable tracking of any emitter by existing or newly designed surveillance satellites, including commercial and military aircraft, and hostile missiles or other optically active targets. Intermittent single burst coded signals radiated by the emitting source, which for personal security applications can be extremely small and easily carried in a concealed fashion, can be detected at one or more satellites or receive nodes and relayed to a central monitoring station, or operations center, where signals are processed and the location of the source is determined. Existing communications channels can be used to relay the location from the central monitoring station to appropriate rescue or interdiction personnel.

10 Claims, 8 Drawing Sheets

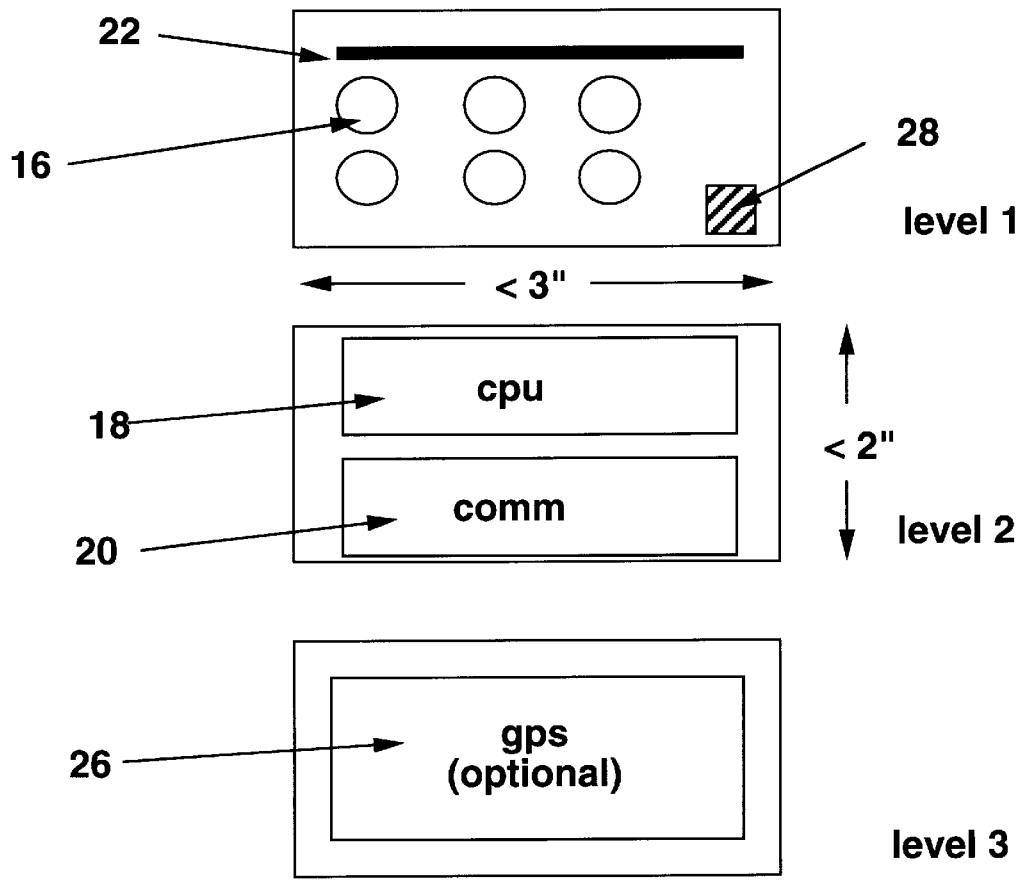
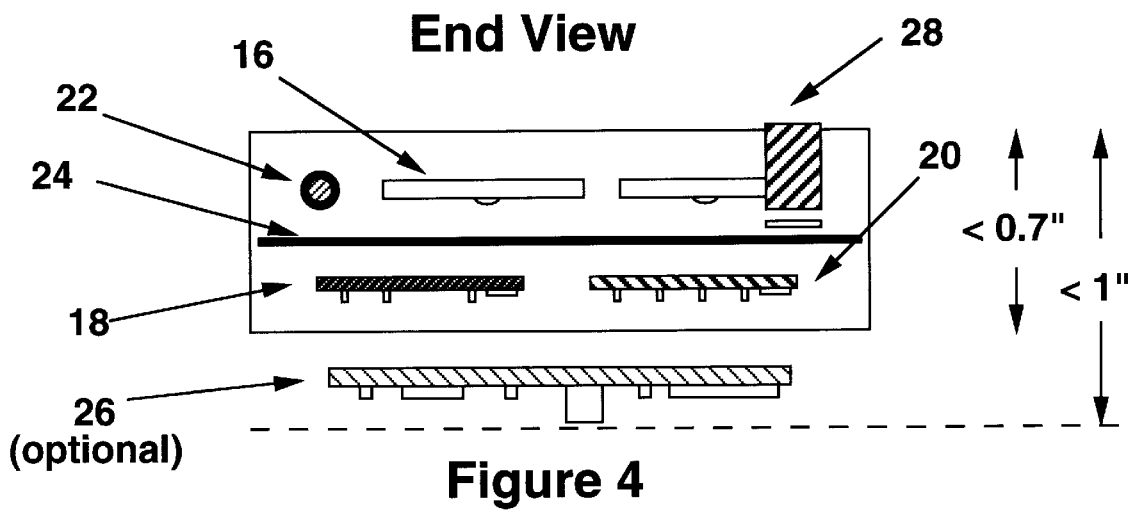
Figure 4

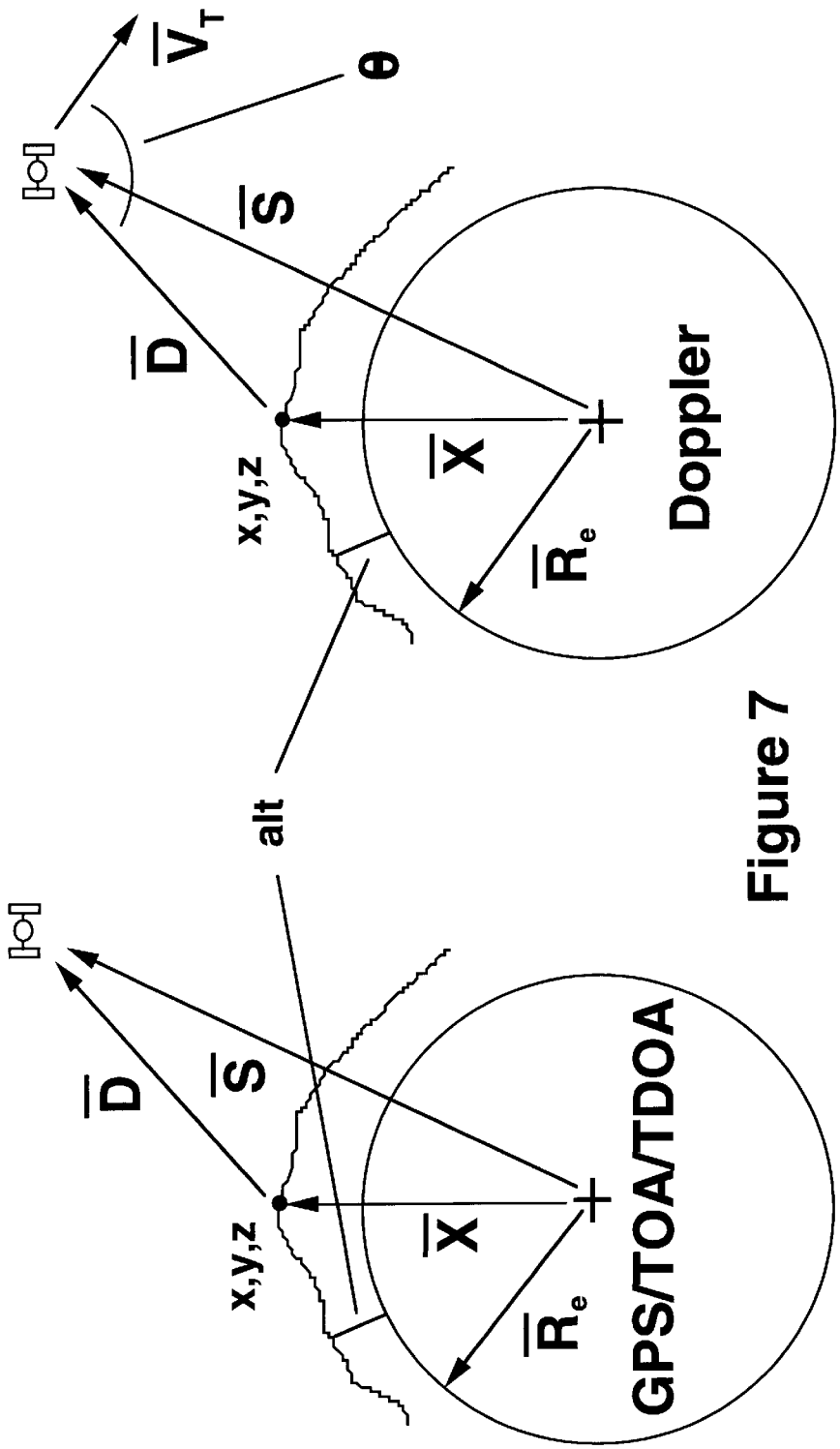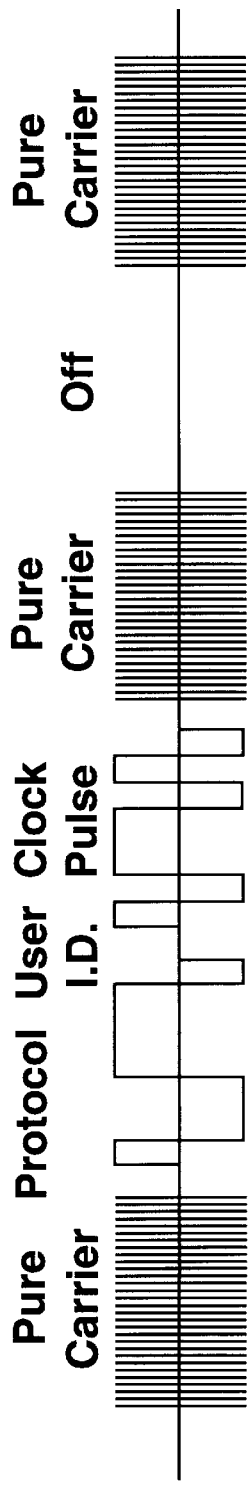
Figure 7

$A = \cos(\Omega) = \{\Delta f/f\} \, c \, / \, Vorb \quad \Omega = \text{Doppler angle}$
$dA = d\Omega \sin(\Omega)$ $PV = \partial A/\partial Vorb = \{\Delta f/f\} \, c \, / \, (Vorb \times Vorb)$
$PF = \partial A/\partial \{\Delta f/f\} = c \, / \, Vorb$ $dA = \sqrt{(dV \times PV)^{\wedge}2 + (df/f \times PF)^{\wedge}2}$ $eD = d\Omega \times h = dA \times h \, / \sin(\Omega) \quad h = \text{altitude}$ $\Sigma e = \sqrt{(eD1)^{\wedge}2 + (eD2)^{\wedge}2 + .. + (esat1)^{\wedge}2 + (esat2)^{\wedge}2 + ..}$

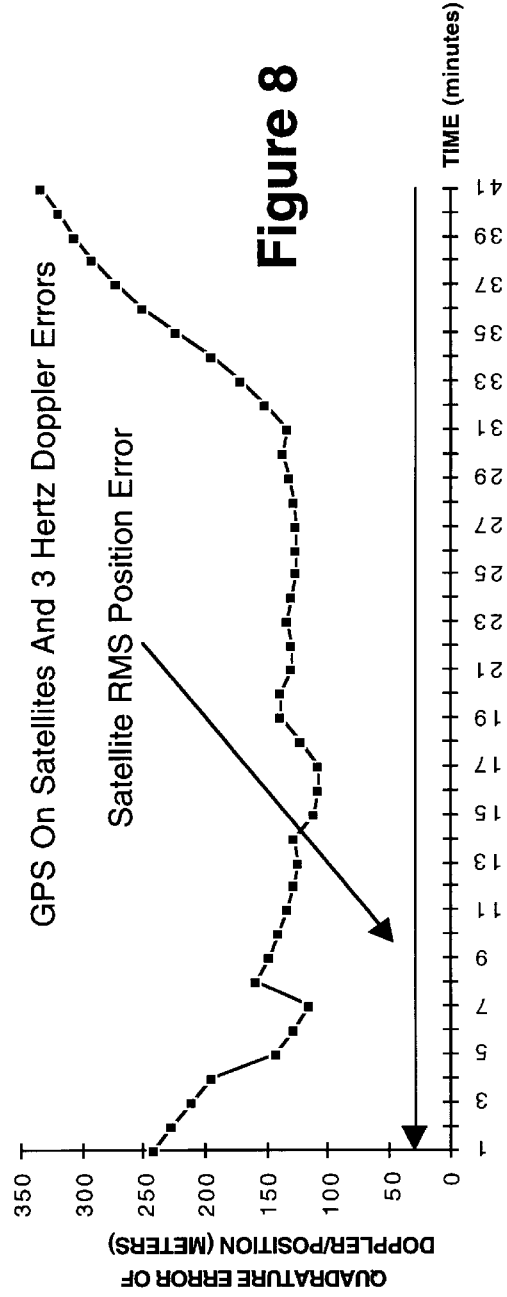

Figure 8

MICRO-MINIATURE BEACON TRANSMIT-ONLY GEO-LOCATION EMERGENCY SYSTEM FOR PERSONAL SECURITY

This application is a continuation-in-part of prior application Ser. No. 08/904,377 filed Aug. 1, 1997, which was a continuation of Ser. No. 08/355,901 filed Dec. 13, 1994 and subsequently abandoned.

BACKGROUND

The radio frequency spectrum has been used in the past for emergency rescue operations, most notably in shipping and aircraft rescues. More recently, geo-location devices have been used to track endangered species. As mobile telephony has developed, the ability to signal for help in emergency situations has also developed. However, in all of the above cases, the geo-location systems either require two-way communications, require relatively long time intervals to acquire the data needed for geo-location, or lack continuous coverage capability. In addition, the emergency transmit/receive units required are relatively large and not convenient to "wear" or conceal, and the battery systems and modes of operation require frequent battery recharging. Also inhibiting continuous use for emergency situations are the problems associated with incapacitation, such as the dialing sequence of operations necessary on current mobile phone systems.

There are a number of geo-location techniques that have been described in the past that appear in this specification. Prior art in emergency rescue at sea and for tracking of endangered species includes a number of existing satellite and ground systems dating back to World War II. These include position determination systems used in navigation, such as LORAN (a form of triangulation), Direction Finding (DF), Transit (Doppler shifts) and GPS (another form of triangulation), as well as emergency beacon location systems such as SARSAT (Doppler shifts) and Argos (Doppler shifts). A brief description of these techniques and the weaknesses relative to the proposed invention is provided in this section, as prior art background.

One of the earliest techniques, direction-finding (DF), was developed during World War II and evolved into systems in use today, such as LORAN and associated techniques using time/phase/angular difference of arrival, to determine angular direction and errors. DF techniques are suitable for use with ground-based cellular receiver networks, such as the current mobile telephone grids, but will not provide sufficient accuracy when used in conjunction with global capability satellite networks that will soon be available. This is fundamentally due to the great distances the satellites are from the transmitters (typically >700 km), and the impact created by this multiplicative factor that transforms the angular uncertainty of the measurement into a position error. However, DF may be used in conjunction with this invention for certain applications where rapid proximity to the transmitter is possible.

Another approach, developed over the last few decades, utilizes Doppler shifts in the frequency of received signals to determine the location of the transmitter. It is well known in physics text books that the shift in frequency depends on the factor (v/c) cos (θ), where the cosine term is the angle between the velocity vector of the satellite and the satellite-beacon line-of-site vector, and c is the speed of light. NASA has employed this technique for it's SARSAT program (search and rescue satellite). One of the drawbacks of that system is that it takes several satellite passes to determine location (it determines the zero-Doppler shift direction which provides a direction perpendicular to the satellite orbit), which means that accurate locations cannot be determined for the order of hours, the time it takes for multiple satellite passes. Newer approaches (such as the Orbcomm system, which will be fully operational in two years) can determine position to the order of a few hundred meters, but takes a complete pass (of the order of 10–15 minutes) of a single satellite to acquire sufficient data. In contrast, the proposed system will only need a simultaneous single data reception by a few visible satellites to determine location. This will minimize the energy required to provide a sufficient operational lifetime for the invention. In summary, the proposed invention device now represents an improvement over conventional geo-location systems utilizing a single satellite detecting beacon signals over a period of time or several different satellites detecting beacon signals at different times or systems wherein the satellite nodes transmit beacon signals rather than receive them or any prior art system using the time variation of the Doppler shift to determine geo-location, such as Transit, which require multiple expensive transmitter systems and separate communications systems to provide geo-location information to rescue organizations.

Time difference of arrival (TDOA) and time of arrival (TOA) techniques can be considered a subset of triangulation and direction-finding, but require a minimum of three simultaneous measurements to determine position unambiguously (by the intersection of the transit-time "circles" (TOA) or the intersection of hyperbolas from pairs of TDOA relative measurements). However, TDOA/TOA in combination with Doppler can reduce this constraint, provided that clock and/or relative times of arrival uncertainties can be reduced to provide the needed accuracy. This synergism can be used in the proposed invention to reduce the number of satellites that must receive the beacon signal. In summary, the proposed invention device now represents an improvement over conventional geo-location systems where the ground or satellite nodes transmit beacon signals rather than receive them, such as GPS and LORAN systems, which require multiple expensive transmitter systems and separate communications systems to provide geo-location information to rescue organizations.

The Global Positioning System (GPS), which was developed and launched by DoD and contractor Rockwell, depends on receiver units being able to lock-on to signals from three or more GPS satellites to calculate a position. As opposed to the system proposed herein, GPS transmitters are in space, and the receiver is carried by the user; thus it is a "receive-only" system. The position errors, depending on the code the receiver is authorized to receive, are extremely small (of the order of less than a meter for the military codes). However, the units are relatively expensive ($200–$500), and in certain instances may not be able to lock-on to these signals due to terrain blockages and satellite radiated power limitations.

Other geo-location techniques include use of the amplitudes of received signals to determine location (analogous to TOA) and inertial guidance. Amplitude techniques suffer from amplitude variations induced by weather, absorption and fading due to phase interference. Advances in inertial guidance systems and miniaturization of associated components designed to measure accelerations, made principally by the Department of Defense (DoD) funded programs, will enable accurate geo-location to be made. However the systems are currently extremely expensive ($20K–$80K for avionics-quality miniaturized gyros/accelerometers) and would require frequent reference updates (of the order of hours to days) depending on the accuracy errors tolerable.

The following references are provided as examples of prior art (all refer to systems that are at least twenty years old since conception and description in the open literature), and no claim to novelty is made for these techniques, individually, as they are described in the literature:

Transit—Johns Hopkins APL TECHNICAL DIGEST January-March 1981, Volume 2, Number 1.

LORAN—"LORAN Long Range Navigation", J. A. Pierce, A. A. McKenzie and R. H. Woodward, McGraw-Hill Book Company, New York, 1948.

GPS—"Global Positioning System", Vol #1 NAVIGATION, The Institute of Navigation, 815 Fifteenth Street, Suite 832, Washington, D.C 20005, 1980: "Principle of Operation of NAVSTAR and System Characteristics", R. J. Milliken and C. J. Zoller Argos—"Proceedings For The Eleventh Annual Gulf Of Mexico Information Transfer Meeting", New Orleans, La., pg. 230–232, November 1990, U.S. Dept. of Interior Minerals and Management Service, Published October 1991, Contract #1435-0001-30499, MMS-91-0040, 524 pages.

SARSAT—"Ambiguity Resolution For Satellite Doppler Positioning System", P. Argentiero and J. W. Marini, *IEEE Transactions On Aerospace And Electronics*, pg 439, May 1979.

DF—"Principles Of High-Resolution Radar", August W. Rihaczek, Peninsula Publishing, P.O. Box 867, Los Altos, Calif. 94023,1985.

It should be noted that the geo-location determination in all of these systems is conceptually simple, relying on the intersection of solid geometry surfaces, a technique which can be found in many high school and college freshman-level text books.

The invention described herein is different in several respects from prior art described above. First, the geo-location techniques utilized are novel and different from those currently in use. All present systems, with the exception of single-pass Doppler, are "receive-only", versus "transmit-only" for this invention. The device takes advantage of the new geo-location techniques through the use of micro-miniaturization and utilizes no power until activated by one of several sequences or methods, and thus requires little or no power until used, making miniature battery power sources feasible. Since it broadcasts infrequently when activated, the energy drain on batteries allows operation over sufficient periods of time to allow rescues to be made. Further, miniaturization is made possible by compact, omni-directional antenna designs, or easily configurable antenna placements, depending on the operational frequency of the unit. The principles used in these novel techniques have also been applied to the use of beacons which emit visible or infra-red (IR) radiation.

Finally, the use of microprocessor technologies allows the sequence of operations to be activated, allowing micro-miniaturization for concealment to be possible, as well as affordable. The use of this device with satellite constellations allows global coverage, if desirable. Other units can function with cellular or wireless networks for metropolitan area coverage.

SUMMARY OF THE INVENTION

The major components of the micro-miniature emergency geo-location beacon transmitter generated in accordance with the present invention consists of the following functional components and/or subsystems. A critical component is a miniaturized antenna system capable of providing a significant signal strength to satellite, cellular, or wireless radio receiver antennas that can be from 10 to 500 kilometers distant, depending upon the particular receiving system chosen. Several antenna configurations are possible, including multi-turn loops, center- or end-fed dipoles, or dielectric patch antennas. Each type of antenna has a somewhat different angular distribution of radiated power, which must be adjusted to optimize signal in the receiver direction (overhead for satellites and near-horizon for terrestrial receivers). The radiation patterns have been analyzed in textbooks (e.g., "Antenna Theory and Design," by R. S. Elliott, Prentice-Hall, Inc., 1981) and by judicious selection of size and wavelength, the patterns can be selected for optimum use. For loop antennas with large wavelengths (compared to the antenna radius), the radiated power can be written as $$P=(ka)^2 \eta I^2 J_1^2 (ka \sin \theta) n^2/(2r^2)$$

where $\eta$ is the impedance of free space, n=# of turns and $\theta=0$ points to the zenith. For a=2.5 $\lambda$, this pattern is lobed, with a strong zenith radiation power. If the wavelength is small compared to the antenna radius, then the radiated power is $$P=(ka)^4 I^2 \eta (\sin^2 \theta) n^2/(32 r^2)$$

and for a=0.05 ($\lambda$), this pattern has a null in the zenith direction and maximum strength in the horizontal direction ($\theta=+90/-90$). For a traveling wave loop (ka=1), the modes "reverse," with a null in the horizon direction and a maximum in the vertical direction. For linear dipoles, the power can be written $$P = 2\eta \frac{I^2}{(4\pi r)^2} \left[ \cos^2\left(\frac{\pi}{2}\right) \cos \theta / \sin^2 \theta \right]$$

for $\lambda=4$ L, and for large wavelengths (2 L<<$\lambda$) as $$P = (kL)^2 \frac{\eta I^2}{(4\pi r^2)} \sin^2 \theta$$

In all cases, the radiation resistance $R_{rad}$ can reveal the total radiated power by the formula $$P_{rad} = \frac{I^2}{2} R_{rad}$$

The electric field at a receiving antenna can be determined from the formula $$E(v/m) = \frac{1}{r}\sqrt{P\mu_o c/(2\pi)} \qquad P = \text{power in watts}$$

This allows the current that flows in the receiving antenna to be calculated. The absorbed power also traditionally can be determined from a reciprocity calculation which yields $$P_{abs}=P_{rad}D \quad D=\text{directivity}$$

A second key component is the communications processor. This unit provides a local oscillator to provide the carrier frequency for the communications system. Frequencies range from 100 MHz to 20 GHz, depending on the particular system (satellite, cellular, wireless, etc.). In addition, electronic circuitry is present to convert position or location (latitude, longitude) information (if available from GPS) into the proper carrier frequency modulation to encode the data. In addition, communications signal protocols are impressed on the carrier so that the receiving systems can open a phone link to the central monitoring unit. Identification codes also can appear in the carrier for phone link systems. For geo-location systems dependent on determining bearing to the beacon signal and/or Doppler information, only identification data needs to be encoded in the carrier. Also, included are amplifiers and impedance matchers for the antenna interface. This technology is well established; the unique feature in this invention is the micro-miniaturization to reduce the unit to the order of 1–2 centimeters in thickness. This can be accomplished via a full scale integrated circuitry concept, combining all key sub components on one board/chip. Since the unit will only broadcast intermittently, passive heat sinking can be utilized to reduce components to minimum size consistent with low duty cycle heating.

A third component of the device is a central processor unit (CPU) which controls the operation of the device. The major functions of the CPU include: device status (battery, test sequence, etc.), transfer of data to the communications processor, device activation (mechanical, voice code, timer, etc.), and control of the above device states.

Typical device status features include battery voltage and current capability (under load) testing at periodic intervals to ensure sufficient energy is available for beacon signals to exceed detection thresholds. In addition, proper operation of key sub components needs to be monitored. This can include presence of carrier signal at the local oscillator, modulation checks, and the presence of appropriate RF power at the antenna. To conserve power, test sequences would be activated manually prior to use.

The CPU will also transfer data from memory (identification codes and transmission protocols) to the communications processor. Data could include position information if GPS receivers are incorporated. The overall control of the device, via ROM programs resident in the CPU, allows the selection of key operating modes, test/status, and transmit.

There are several possible modes to activate the device. The simplest can be mechanical pressure (i.e., pushing a button), but care needs to be taken to prevent inadvertent activation by small children. This could include requiring multiple touches within a short time period for the beacon to turn on, which would greatly reduce the "false alarm" rate. Voice activation is another option, in case the holder of the device is bound and unable to reach the device with his hands. Again, a voice sequence that is not susceptible to accidental activation needs to be programmed into the device CPU. A third option is to have the device activate automatically after a fixed time interval (that could be adjusted by the user). This would be the most reliable method, but would increase the likelihood of heavy beacon traffic in large population areas, and would also require more frequent recharging. Finally, the device could be activated by a transmitted signal to turn on the device for a single up-link broadcast.

Use of visible or IR beacons makes the implementation of the micro-miniaturization easier, since these radiation sources can be more compact, the radiation patterns are more easily tailored with gradient index lenses, as opposed to relatively large antennas for the radio-frequency spectrum, and the radiation can be easily modulated, in either amplitude or frequency, to encode the needed data and signal patterns.

DESCRIPTION OF THE DRAWINGS

FIG. 4. shows a mechanical layout of a representative beacon design.

FIG. 7 shows the basic geometry used in implementing a least squares solution for each of the novel geo-location algorithms described and listed in code form in the Appendix, and a notional emit signal protocol.

FIG. 8 contains basic error determination equations used in estimating geo-location errors for the Doppler technique, along with the estimated error magnitudes for an Iridium-like satellite constellation.

DETAILED DESCRIPTION OF PREFERRED EMBODIMENTS

Figure 1:
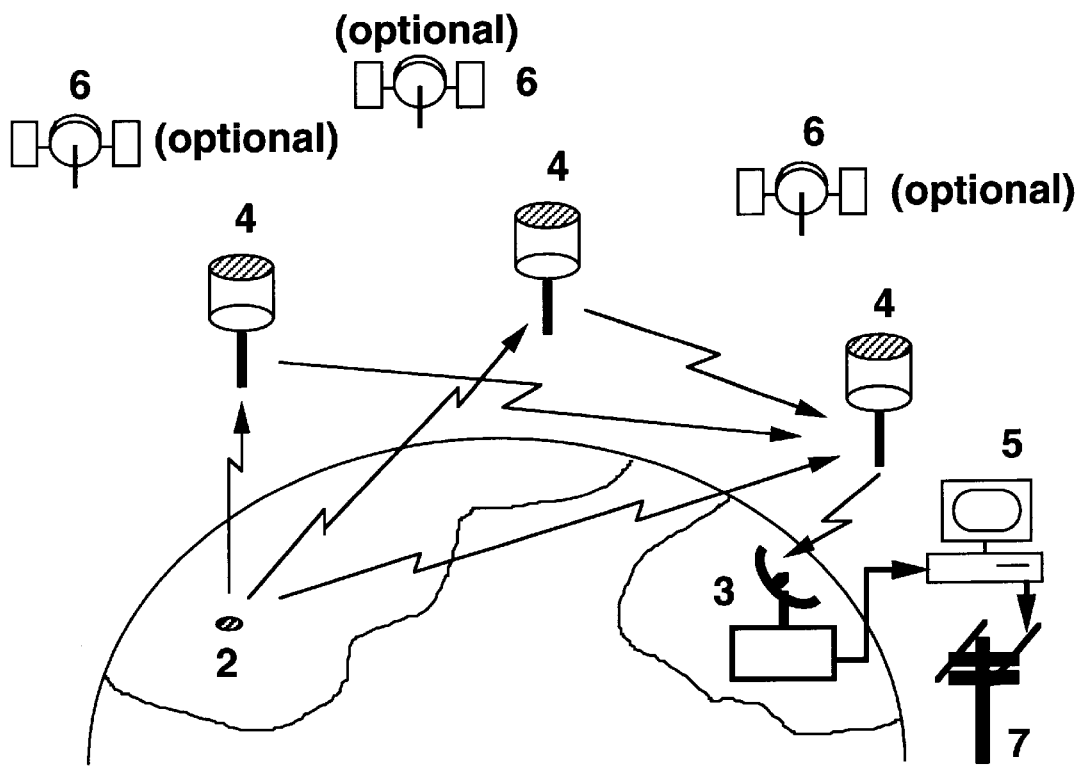
FIG. 1. is a diagram showing LEO communication satellites for receiving beacon signals and higher orbit global positioning satellites (GPS).
Figure 2:
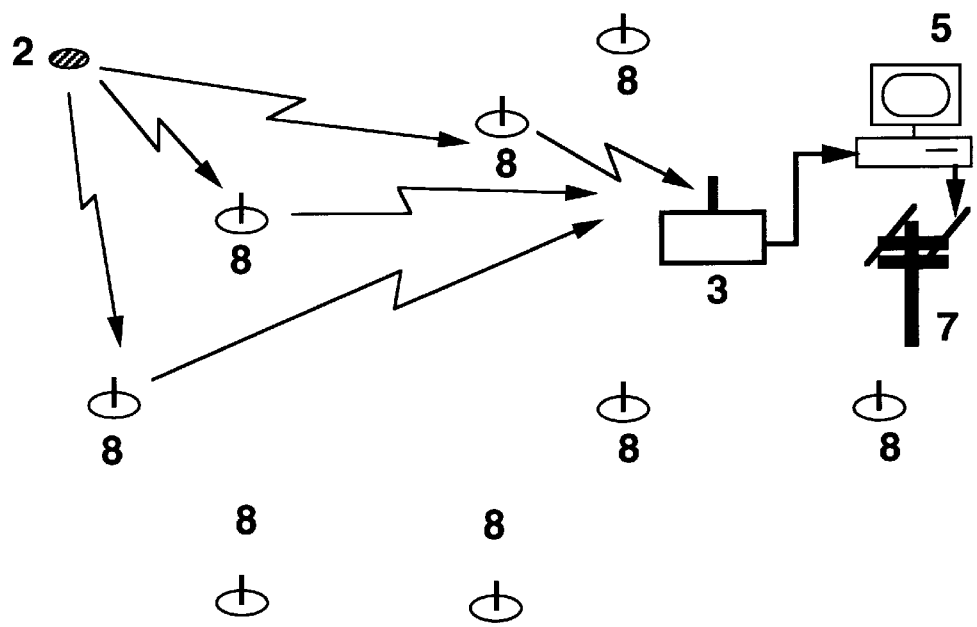
FIG. 2. is a diagram showing terrestrial communications networks such as cellular telephone receiver modes or wireless radio data transmission system antennas.

The three major configurations or modes of operation for this micro-miniature emergency geo-location system are shown in FIGS. 1, 2. The modes allowing global coverage are shown in FIG. 1. The less complex mode utilizes a low earth orbit (LEO) satellite constellation, in which the signal emitted by the emergency beacon 2 is detected by several (>2) satellites 4, and the location of the beacon is determined from the Doppler shifts at the receiving satellites and the satellite positions (which are determined from on-board GPS receivers).

An optional configuration, which could reduce the number of LEO satellites, would utilize a constellation of GPS 6 satellites with a GPS receiver in the emergency beacon, which would then provide location information in the emitted beacon signal and, therefore, would only require one LEO receiving satellite to function. However, this mode requires a larger beacon unit to accommodate the GPS receiver unit. It also requires 30–60 seconds to determine a latitude/longitude data pair and good receipt of GPS signals from at least 3 GPS satellites. In high population areas, a third mode of operation is possible, which utilizes a network of local receivers or nodes 8, as shown in FIG. 2.

These modes can be cellular telephone modes, or can be wireless antennas operating in a slightly different bandwidth. The cellular modes are typically a few miles apart, whereas the wireless RF/radio links can receive signals up to 30 kilometers from the transmitting unit. Both systems rely on direction finding techniques to determine the location of the emergency beacon signal.

An operations center, or central ground monitoring station 3, which is comprised of a satellite or network communications link, a monitoring and processing computer (for geo-location calculation, display of location on computer-stored GIS maps, and telephone lists of with user identification codes and emergency phone numbers), and a conventional modem/telephone link with automated dialing equipment to commercial telephone networks, is shown in FIGS. 1 and 2. The operations center is designed to receive information from all satellites 4, or cellular nodes 8, that pick up a signal from the emergency beacon 2, and signals from all satellites or nodes that were able to receive the beacon signal are either down-linked directly or relayed via cross-link(s) to a satellite in position to down-link to the central monitoring station. Data received by this central ground station with the appropriate identification code is automatically collected by monitoring computer 5, which then processes all data available, using Doppler, triangulation, or other techniques described herein (see Appendix with computer programs) or, if necessary, well known in the art, to provide a location for the emergency beacon. The location latitude/longitude are forwarded by the monitoring computer using a conventional telephone/modem system 7, to pre-determined private security personnel or to the nearest local police via a pre-determined/stored message.

Figure 9:
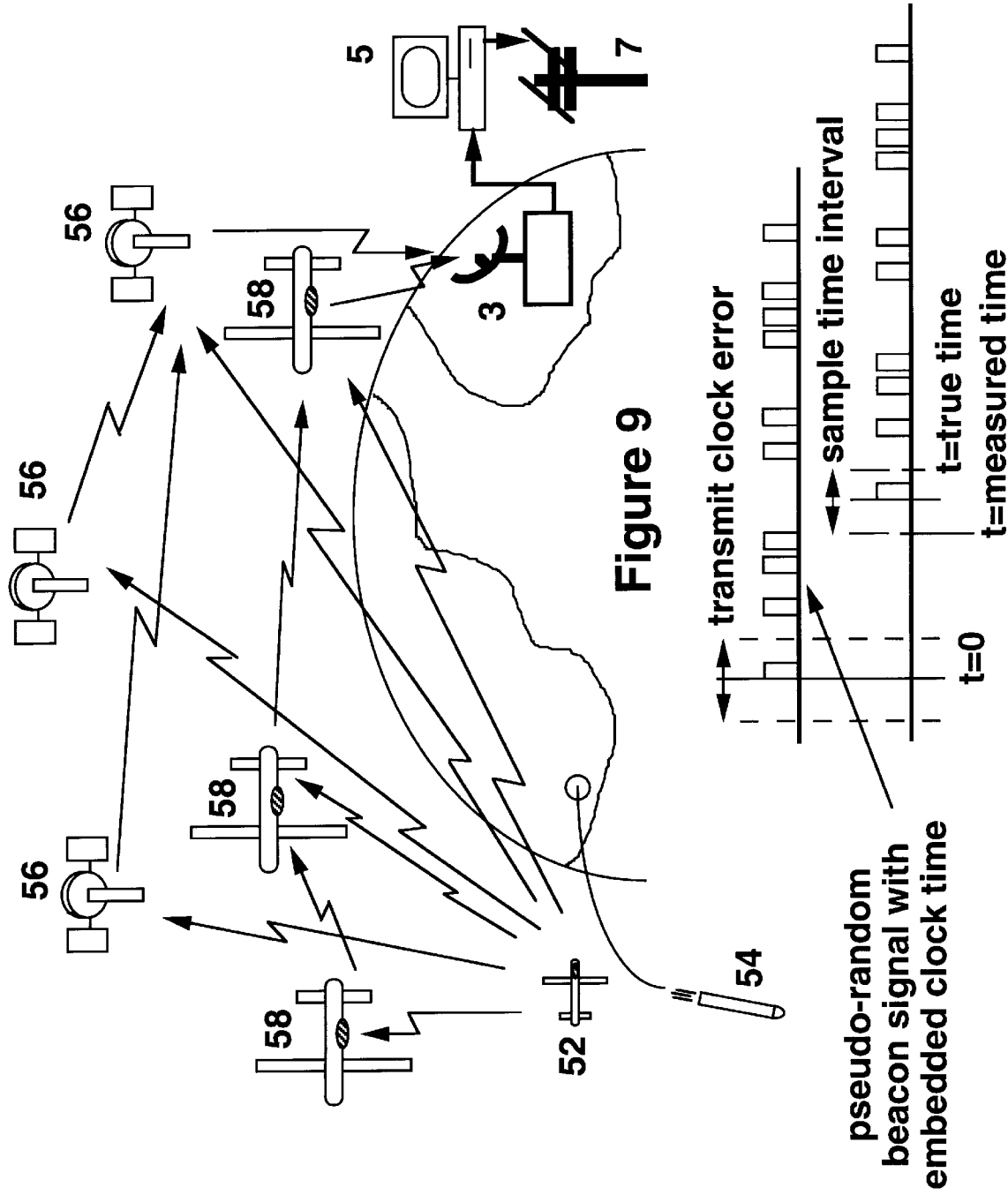
FIG. 9 illustrates the basic components of the geo-location technique which utilizes visible or IR radiation emitting beacons, and the basic time correlation measurement technique used for all timing signals.

A system that utilizes visible or IR signals for geo-location is shown in FIG. 9. Satellites with optical/IR detection telescopes 56, or high flying surveillance aircraft with similar detection payloads 58 detect the emissions from missiles 54 or aircraft beacons 52. The time of detection is recorded and the signals are relayed to the operations center or monitoring station 3 where the monitoring computer 5 processes the signals and calculates the location of the emitters.

Figure 3:
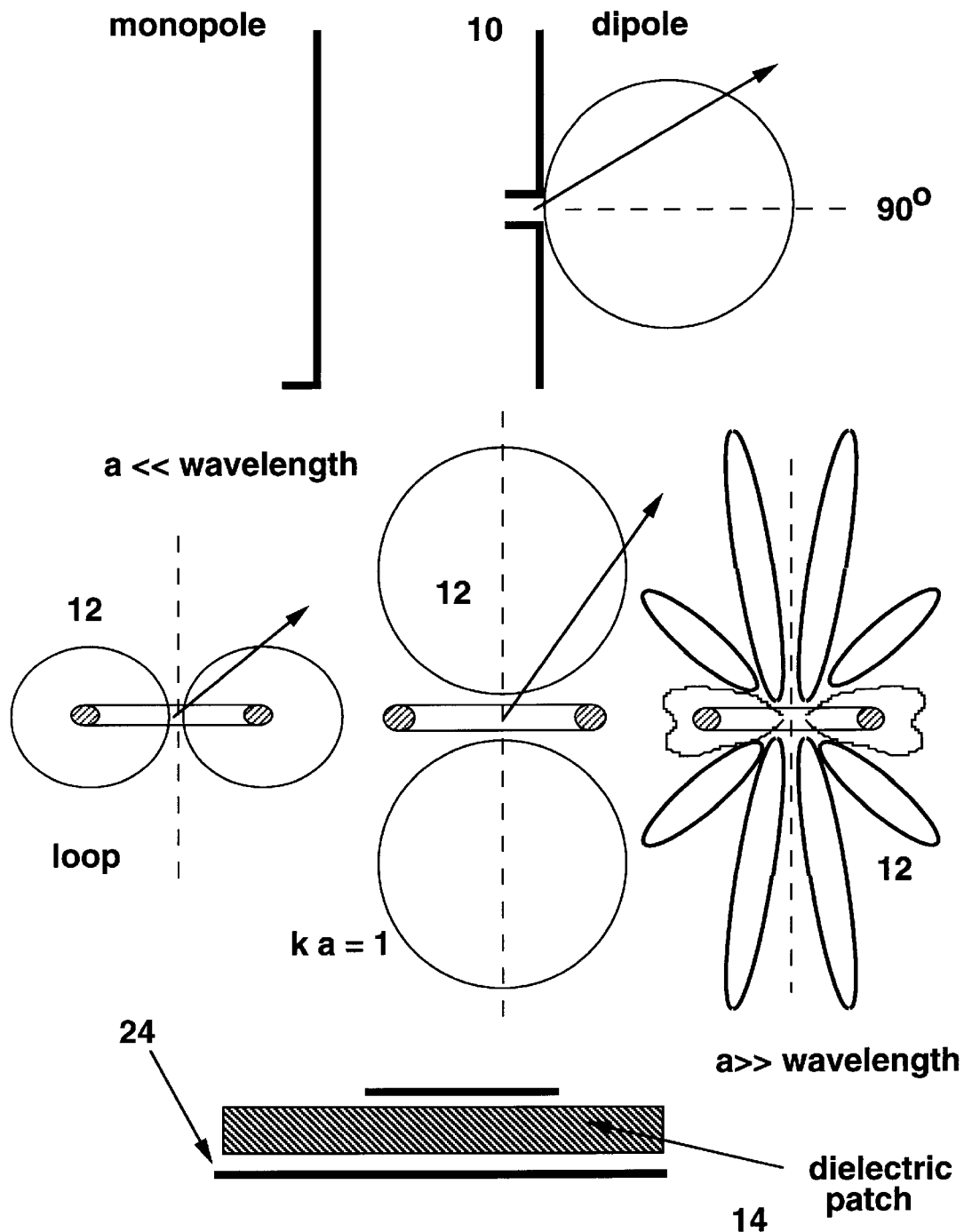
FIG. 3. shows several different beacon antenna configurations and radiation patterns.

The link budget margins for reception of the signal emitted by the beacon will determine the design of the beacon antenna and power supply. There are three antenna configurations that can be utilized, depending on the receiver network configurations shown in FIGS. 1, 2. The three options shown in FIG. 3 are dipole, loop, and dielectric patch antennas. The dipole 10 will be more easily adapted to systems above a few GHz, since the half-wave size will be compatible with very small size (few centimeters). They can also be used at lower frequencies, or be sewn onto clothing. Below a few GHz, multi-turn loop antennas 12 can provide sufficient power at sizes small compared to wavelength. Patch antennas 14 provide a broader radiation pattern, but lower radiated power. An estimate of power levels at receivers can be made using a half-wave dipole, using the previously provided formulas. For a 1 GHz carrier, the power density for a 45 degree angle from zenith is $$P(45°) = P_{rad}/r^2 \left[ \frac{\cos^2(\cos 45)(\pi/2)}{\sin^2 45} \right] \approx \frac{0.65 P_{rad}}{r^2}$$

For a slant path to an orbiting satellite of r=$10^6$ m, the power density per watt of radiated power will be P=0.65 E-12 w/m$^2$ per watt Assuming the receiver has radiation resistance $R_{rad}$≈(0.707) 73, then antenna voltages of $2.5 \times 10^{-6}$ v/m and currents of the order of $5 \times 10^{-8}$ amps would result per watt. For the 5 watt FCC limits, this would result in 0.25 microamps, which should be detectable by the satellite pre-amplifiers. Allowances must be made for obstructions and scattering/absorption, which will reduce received signal strengths. For local networks, such as cellular and RF/wireless receivers, the signal power has already been demonstrated to function adequately (since signals are about $10^3$ times higher than the satellite case). A quarter wave monopole provides reduced attenuation. As is standard in the art, the particular antenna configuration selected will be impedance-matched to the carrier local oscillator, to ensure maximum transfer of oscillator power output to the antenna.

Battery technology will allow use of miniature Hg/Zn batteries, which approach energy densities of 50 watt-hr/lb, sufficient for intermittent operation over long (hours) periods of time, for weights of several ounces. They also have long storage life (>4 years) when the device is not being used.

The central processor unit (CPU) and communications processor will utilize miniaturized versions of current cellular telephone technologies. However, since receive capability is not needed (unless command activated), the circuitry can be reduced in complexity, size, and power. When GPS accuracy is needed, an optional commercial GPS unit will be embedded, with simplifications based on elimination of display characteristics and potentially reduced numbers of satellite signals necessary for geo-location.

A mechanical layout of a representative beacon design is shown in FIG. 4. The beacon can be placed in pockets, strapped to legs or wrists, or be Velcro-attached or sewn into clothing. The device can be disguised as a watch, if worn in an open/visible location. The batteries 16 power the CPU 18 and communications processor 20 (with local oscillator). The antenna 22 is shielded from the electronics by a metal ground plane 24 which enhances radiated power. A GPS unit 26 is optional. A test sequence button 28 allows the unit to be tested for readiness, and also serves to provide activation with multiple pushes.

Figure 5:
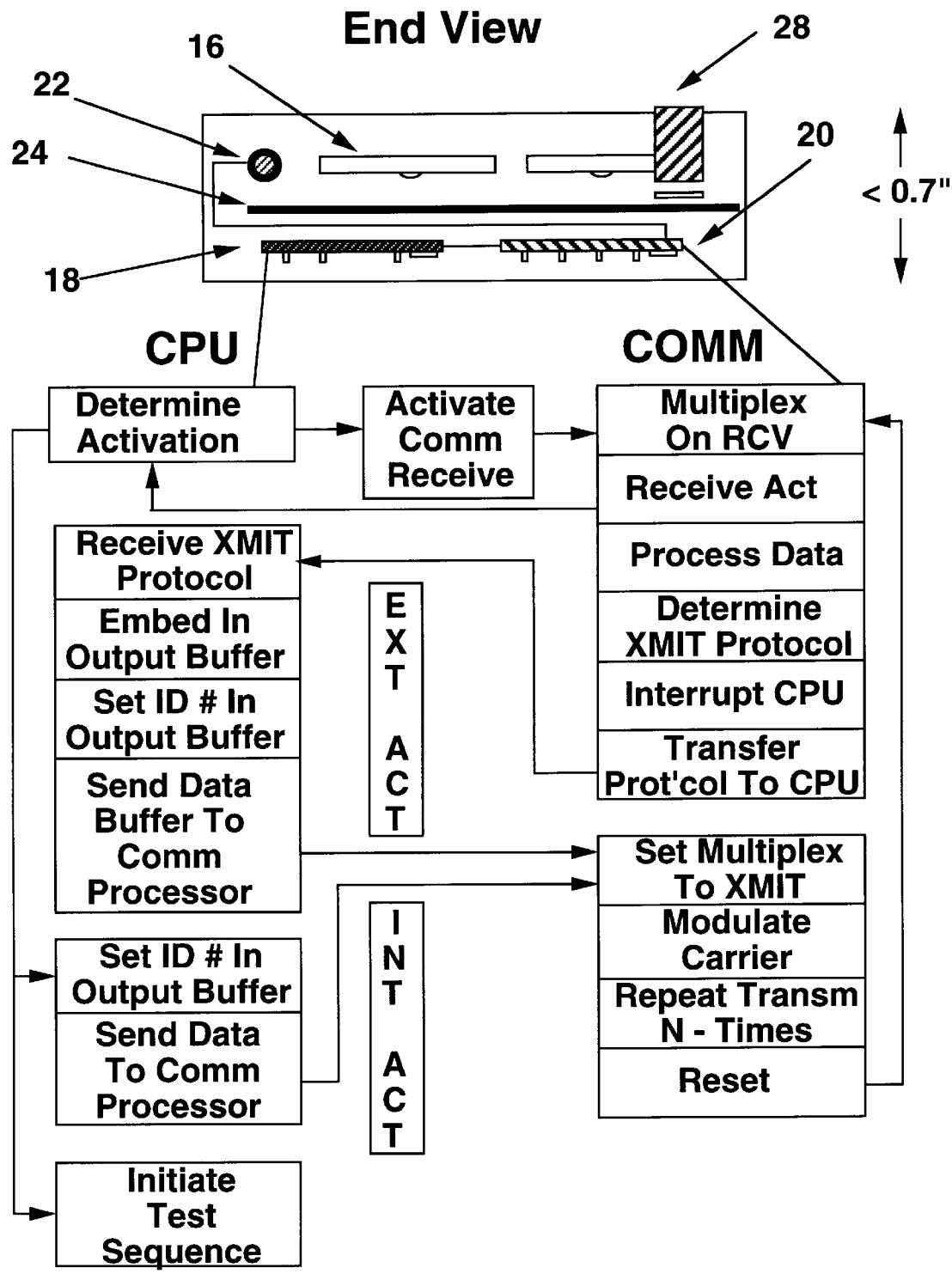
FIG. 5. shows the logic flow for the CPU program controlling the activation of the communications control hardware and the associated events taking place in the communications processor.

The CPU 18 handles control of the device, voice processing for activation (if included), and data set-up for the communications processor (ID., phone protocol, and location data (optional, if applicable)). FIG. 5 contains a top-level flow diagram for the CPU functions that control the communications aspects of the beacon. The CPU provides the signal protocol, which requires an intermittent single burst coded signal pattern. This notional pattern, shown at the bottom of FIG. 7, consists of a sub-pattern consisting of a time period of pure carrier signal (for phase loop lock-in reception purposes), a period of modulated carrier with the detection protocol required by the communications satellite, another period of modulated carrier with the user identification code embedded, a period of pseudo-random pulse modulation (for correlation and transit time extraction), and a final period of pure carrier signal. This pattern is repeated n times in a burst (where n is determined by a high probability that one sub-pattern signal will fall into the acquisition gate of the satellite) to insure that the signal is received by the satellite and forwarded as a normal message. The pattern of n repetitions can be intermittently broadcast at predetermined intervals, or activated by either the user carrying the beacon or via an activation command transmitted to the beacon (in which case the emit burst can be synchronized with the satellite receive window).

A computer program logic flow to control the activation, operation and test for the emergency beacon is shown in FIG. 5. The CPU is tied to the communications processor 20, which in turn is connected to the antenna unit 22 via a multiplexor contained within the communications processor to control the receive mode (only used to detect the presence of an optional remote activation signal), or the transmit mode. The CPU also performs test functions when activated.

Geo-Location Techniques

The novel geo-location techniques claimed in this invention can be segmented into two categories, which relate to the hardware implementation; radiofrequency (RF) and electro-optical (EO/IR). However, the mathematical techniques are almost identical. All of the techniques described below rely on implementation of least square methods, which can be found in many college-level mathematics textbook or mathematics handbooks. For GPS-type and other signal transit time systems (e.g., TOA and TDOA) which utilize a matrix solution approach, the least squares entity that is subsequently operated on by partial derivatives (this differentiated expression is then set to zero for a minimization solution) to extract the equation for the best fit geo-location parameters can be written as $$T = \sum_{i=1}^{4} [(\overline{D_i}) - \rho_i]^2$$

where $\rho_i$ represents the measured parameter (pseudo-range, transit time, etc.) and $\overline{D_i} = \overline{S_i} - \overline{X_i}$ is the vector from the transmit location to the receiver satellite. The geometry is shown in FIG. 7 for both techniques. For Doppler techniques, the least square entity can be written as $$\sum_{i=1}^{4} [(\overline{D_i}) \cdot (\overline{V_{T_i}}) - c|D_i|(\beta f_{m_i} - 1)]^2$$

where $\beta f_{m_i}$ is the ratio of the measured frequency divided by the nominal transmit frequency, c is the speed of light, and $V_T$ is the total velocity vector (satellite velocity plus the transmitter velocity due to the Earth rotation). Taking the partial derivatives of the above function with respect to the x, y and z coordinates yields the matrix equations for determining the best fit for the location of the transmitter. The matrix equations are shown coded in MathCad in the code listing section that follows. The above techniques do not require knowledge of the Earth terrain to determine a solution, provided that four measured independent parameters are available. This can be accomplished with as few as two satellites.

Figure 6:
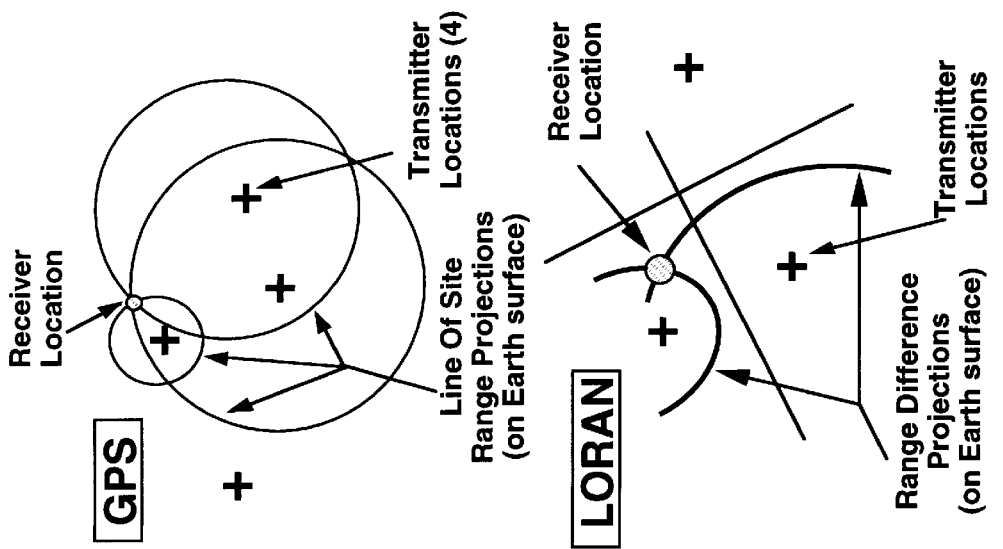
FIG. 6 shows a composite illustration of prior art in geo-location for triangulation and Doppler techniques found in numerous textbooks and journal references.

A more straight-forward approach can be used if the Earth terrain is known in the area of the transmit beacon. This approach utilizes a least square minimization of the difference between calculated and measured parameters (e.g., distance or time interval), determined over a grid which contains terrain altitude (above the Earth geoid) at each grid point. Due to Doppler effects from the rotating Earth, it should be possible to geo-locate with Doppler and TOA signals from one satellite. Alternatively, if accuracy can be relaxed, simple quadratic solid geometry equations (representing spheres, paraboloids and hyperboloids that can be generated from the measured parameters) can be used to solve for the transmit location with three independent parameters, as is frequently depicted in high school and college mathematics books showing how to solve for the intersection of simple quadratic surfaces. FIG. 6 illustrates the solid geometry approach as it relates to prior art references. The program for this grid-search minimization method is also shown in an Appendix below.

For geo-location determination of optical sources, the above techniques can be used after the basic parameter (time interval) is extracted from the measurement. In the case of non-cooperative sources (ones whose content cannot be programmed), a traditional radio-astronomy technique, called auto-correlation, is utilized to determine the time difference of signals detected at three or more satellites. A simple description of the technique is shown in the bottom of FIG. 9. The correlation integral is equivalent to "sliding" the transmitted wave form over the received wave form in small steps and summing the product of the two amplitudes. This sum peaks when the two sets of signals perfectly overlap- the amount of time shift necessary gives the true time interval between transmission and reception of the signal. For the GPS/TDOA/TOA systems described above, the correlation integral can be done digitally (with a DSP signal processing chip) off-line at the monitoring center. The auto-correlation determines the time difference between signal arrivals to much greater accuracy than the clock sampling time intervals recorded with the signals by the satellite optical detectors. Most optical emissions, for example from a missile exhaust plume, are sufficiently random (i.e., the intensity as a function of time exhibits random fluctuations) so as to have an effectively infinite "repeat interval", so that any time ambiguity from a pattern "alias" (such as the relatively short "C/A code" in a GPS system) should not occur.

Systems such as those described above can be used for cooperative high flying aircraft (e.g., for an FAA global passive tracking system), provided that the optical beacon has a sufficiently long pulse repetition interval. Detection can done with standard solid state detector focal plane arrays (FPAs) using visible or IR semiconductor materials (e.g., silicon compounds for visible, HgCdTe for IR). Sufficient number of pixels are necessary (e.g.,>1024×1024) to resolve closely spaced transmitting sources, which should be feasible for LEO satellites. The detailed design principles for such a detection system have been described by this inventor in U.S. Pat. No. 5,604,595, and thus will not be repeated in this specification. Since the geo-location calculation does not depend on precise direction measurements, the detection telescope alignment is not critical, which should lower satellite costs. In addition, narrow-band sources and detectors can be utilized, so that background signals from the ground or atmospheric phenomenon can be effectively suppressed. A notional system is shown in FIG. 9.

It should be noted that the very precise geo-location achievable with current GPS and DGPS systems will not likely be necessary for emergency rescue applications. Geo-location errors no less than of the order of 100 meters are required. Thus tolerances on components may be relaxed to achieve micro-miniaturization, and satellite overlap coverage constraints may also be relaxed, allowing for less costly space systems. Precise error calculations have been programmed for the various techniques described, including errors from atmospheric effects, satellite state vector errors and instrument errors such as frequency and clock precision, and appear in a commercially available program ("GLM", copyright May 1998). Initial error calculations for a Doppler system using an Iridium-like satellite constellation are shown in FIG. 8.

Listing Of Geo-Location Computer Programs
Appendix

MELS Geolocation Program
Case #1: Satellites With Doppler And Triangulation (TOA)
Date: Sep. 28, 1996
Summary: This program is a prototype for the general satellite case and calculates position location from Doppler and TOA data from only one satellite. The read-in topography file is not yet implemented.

Program constants:

$RadiusEarth := 6378$ $AltGrid_{1,1} := 0.100$ $latitude := 38.8$ $longtitude := -77.0$ $omegaEarth := 7.29 \cdot 10^{-5}$ $timesec := 0$ $timemin := 0$ $timehour := 0$ $time := timehour \cdot 3600 + timemin \cdot 60 + timesec$ $SatPosVect := \begin{pmatrix} 0 \\ 0 \\ 7028 \end{pmatrix}$ $SatVelVect := \begin{pmatrix} 0 \\ 7.2 \\ 0 \end{pmatrix}$ $c := 2.997930 \cdot 10^5$ $freq := 240.50 \cdot 10^6$ $vorb := |SatVelVect|$ $deltafreq := 4804.885115$ $toadif := 19420.602 \cdot 10^{-6}$ $xvec := \begin{pmatrix} 1 \\ 0 \\ 0 \end{pmatrix}$ $yvec := \begin{pmatrix} 0 \\ 1 \\ 0 \end{pmatrix}$ $zvec := \begin{pmatrix} 0 \\ 0 \\ 1 \end{pmatrix}$ $rho := RadiusEarth + AltGrid_{1,1}$ $phi := longtitude \cdot \dfrac{\pi}{180} + time \cdot omegaEarth \qquad time \cdot omegaEarth = 0$ $theta := \dfrac{(90.000 - latitude)}{90.000} \cdot \dfrac{\pi}{2} \qquad phi = -1.343903524$ $RotMat := \begin{pmatrix} rho \cdot \sin(theta) \cdot \cos(phi) & 0 & 0 \\ 0 & rho \cdot \sin(theta) \cdot \sin(phi) & 0 \\ 0 & 0 & rho \cdot \cos(theta) \end{pmatrix}$ $X := RotMat \cdot xvec$ $Y := RotMat \cdot yvec$ $Z := RotMat \cdot zvec$ $X_0 = 1.118163188 \cdot 10^3$ $Y_1 = -4.843296871 \cdot 10^3$ $Z_2 = 3.996541769 \cdot 10^3$ -continued $$distrav := c \cdot toadif$$

$$\cos thDop := \left[\left(\frac{deltafreq}{freq}\right) \cdot \frac{c}{vorb}\right]$$

$$electden := 1 \cdot 10^6$$

$$plasmaf := 8.98 \cdot 10^3 \cdot \sqrt{electden}$$

$$plasmaf = 8.98 \cdot 10^6$$

$$\cos thinc := \frac{\pi}{100}$$

$$edenvect := \begin{bmatrix} 0.2 \cdot 10^6 \\ 1.5 \cdot 10^6 \\ 1.3 \cdot 10^6 \\ 0.6 \cdot 10^6 \\ 0.4 \cdot 10^6 \\ 0.2 \cdot 10^6 \\ 0.1 \cdot 10^6 \\ 0.05 \cdot 10^6 \\ 0.03 \cdot 10^6 \\ 0.02 \cdot 10^6 \end{bmatrix} \quad dh := 100 \cdot 10^3$$

$$indexref := \sqrt{1 - \left(\frac{plasmaf}{freq}\right)^2}$$

$$TEC := \left(\sum edenvect\right) \cdot \frac{dh \cdot 10^6}{\cos(\cos thinc)}$$

$$indexref = 0.999302661$$

$$TEC = 4.402172206 \cdot 10^{17}$$

$$freq2 := 2.4$$

$$tiondelay := \frac{40.3}{c \cdot 10^3 \cdot freq^2} \cdot TEC$$

$$freq1 := \frac{freq}{10^9}$$

$$tiondelay = 1.023105511 \cdot 10^{-6}$$

$$toadif2 := 19400 \cdot 10^{-6}$$

$$tatmdelay := \left(\frac{1}{\left|\frac{1}{c} - \frac{1.003}{c}\right| \cdot 8}\right)^{-1}$$

$$kslope := \left[\left|\frac{\left(\frac{1}{freq2^2} - \frac{1}{freq1^2}\right)}{(toadif2 - toadif)}\right|\right]^{-1}$$

$$tatmdelay = 8.005523811 \cdot 10^{-8}$$

$$kslope = 1.203712159 \cdot 10^{-6}$$

$$deltat0 := \frac{kslope}{2} \cdot \frac{\left|\frac{1}{freq^2} + \frac{1}{freq2^2}\right|}{toadif + toadif2}$$

$$delta0 = 2.69158378 \cdot 10^{-6}$$

$$grpvel := \frac{c}{\left[indexref + \frac{1}{indexref} \cdot \left(\frac{plasmaf}{freq}\right)^2\right]}$$

$$grpvel = 2.995839426 \cdot 10^5$$

$$GeoVect := \begin{pmatrix} X_0 \\ Y_1 \\ Z_3 \end{pmatrix}$$

$$DifVec := GeoVect - SatPosVect$$

$$\cos ang := GeoVect \cdot \frac{DifVec}{(|GeoVect| \cdot |DifVec|)} \quad \text{Ionosphere angle}$$

$$ang1 := \operatorname{acos}(\cos ang)$$

$$ang := 180 - \frac{180}{\pi} \cdot ang1 \qquad toaest := \frac{|DifVec|}{c}$$

$$ang = 109.822404269 \qquad toaest = 0.019420602$$

$$\cos ang2 := DifVec \cdot \frac{SatVelVect}{(|DifVec| \cdot |SatVelVect|)} \quad \text{Dopper angle}$$

$$ang2 := \operatorname{acos}(\cos ang2) \cdot \frac{180}{\pi} \quad ang2 = 146.291602191 \quad \cos ang2 = -0.83187279$$

$$iondepth := 400$$

$$delta0p := \left[\frac{\left(\frac{iondepth}{\cos\left(ang \cdot \frac{\pi}{180}\right)}\right)^{-1}}{\left(\frac{1}{c} - \frac{1}{grpvel}\right)}\right]^{-1}$$

$$delta0p = 2.745681785 \cdot 10^{-6}$$

This section calculates the differences between measured and actual values for the TOA and Doppler angle parameters:

the sum of the two differences is calculated for each point on the earth surface grid, and the minimum sum determines the location coordinates. An altitude profile file must be input for the general area around the estimated location.

$latstart := 38.75$ $longstart := -77.15$ $inittheta := 90 - latstart$ $initphi := longstart$ $deltaphi := 0.01$ $deltatheta := 0.01$ $oldmin := 10^9$ $thetasol := 0$ $phisol := 0$ $\cos calc := \left(\frac{deltafreq}{freq}\right) \cdot \frac{c}{vorb}$ $\cos calc = 0.83187279$ $\cos Dop := \cos calc$ $\cos Dop = 0.83187279$ $Dopang := \mathrm{acos}(\cos Dop) \cdot \frac{180}{\pi}$ $Dopang = 33.708397799$ $vorb = 7.2$ $velmag := \sqrt{SatVelVect \cdot SatVelVect}$ $velmag = 7.2$ $alt := AltGrid_{1,1}$ Start of loops $i := 0 \ldots 10$ $j := 0 \ldots 35$ $thetagrid_{i,j} := ((^{-}i) \cdot deltatheta + inittheta) \cdot \frac{\pi}{180}$ $phigrid_{i,j} := ((j) \cdot deltaphi + initphi) \cdot \frac{\pi}{180} + time \cdot omegaEarth$ $xg_{i,j} := RadiusEarth \cdot \sin(thetagrid_{i,j}) \cdot \cos(phigrid_{i,j})$ $yg_{i,j} := RadiusEarth \cdot \sin(thetagrid_{i,j}) \cdot \sin(phigrid_{i,j})$ $zg_{i,j} := RadiusEarth \cdot \cos(thetagrid_{i,j})$ Take into account the velocity of the Earth's rotation $losx_{i,j} := SatPosVect_0 - xg_{i,j} \quad losy_{i,j} := SatPosVect_1 - yg_{i,j}$ $losz_{i,j} := SatPosVect_2 - zg_{i,j}$ $omegx_{i,j} := yg_{i,j} \quad omegy_{i,j} := xg_{i,j}$ $omegv_{i,j} := (RadiusEarth + alt) \cdot omegaEarth \cdot$ $\dfrac{(omegx_{i,j} \cdot losx_{i,j} + omegy_{i,j} \cdot losy_{i,j})}{\sqrt{(losx_{i,j})^2 + (losy_{i,j})^2 + (losz_{i,j})^2} \cdot \sqrt{(omegx_{i,j})^2 + (omegy_{i,j})^2}}$ $satvel_{i,j} :=$ -continued $\dfrac{SatVelVect_0 \cdot losx_{i,j} + SatVelVect_1 \cdot losy_{i,j} + SatVelVect_2 \cdot losz_{i,j}}{\sqrt{(losx_{i,j})^2 + (losy_{i,j})^2 + (losz_{i,j})^2}}$ $vrel_{i,j} := satvel_{i,j} + omegv_{i,j}$ $\cos Dop_{i,j} := \left(\dfrac{deltafreq}{freq}\right) \cdot \dfrac{c}{vrel_{i,j}}$ $min1_{i,j} :=$ $\sqrt{\begin{array}{l}\left[(SatPosVect_0) - \left(xg_{i,j} + alt \cdot \dfrac{xg_{i,j}}{RadiusEarth}\right)\right]^2 + \\ \left[(SatPosVect_1) - \left(yg_{i,j} + alt \cdot \dfrac{yg_{i,j}}{RadiusEarth}\right)\right]^2 + \\ \left[(SatPosVect_2) - \left(zg_{i,j} + alt \cdot \dfrac{zg_{i,j}}{RadiusEarth}\right)\right]^2\end{array}} - c\, toadif$ $min2_{i,j} :=$ $\sqrt{\begin{array}{l}\left[\left[(SatPosVect_0) - \left(xg_{i,j} + alt \cdot \dfrac{xg_{i,j}}{RadiusEarth}\right)\right] \cdot SatVelVect_0\right]^2 + \\ \left[\left[(SatPosVect_1) - \left(yg_{i,j} + alt \cdot \dfrac{yg_{i,j}}{RadiusEarth}\right)\right] \cdot SatVelVect_1\right]^2 + \\ \left[\left[(SatPosVect_2) - \left(zg_{i,j} + alt \cdot \dfrac{zg_{i,j}}{RadiusEarth}\right)\right] \cdot SatVelVect_2\right]^2\end{array}} -$ $|min1_{i,j} + c\,toadif| \cdot |vrel_{i,j}| \cdot |\cos Dop_{i,j}|$ $mintot_{i,j} := \sqrt{(min1_{i,j})^2} + \sqrt{(min2_{i,j})^2}$ $M_{i,j} := mintot_{i,j}$ $Geo := \min(M)$ $Geo := 7.281331364 \cdot 10^{-5}$ $k := 0 \ldots 10$ $l := 0 \ldots 35$ $Valx_{k,l} := \mathrm{if}(M_{k,l} = Geo, k, 0)$ $mthval := \max(Valx)$ $Valy_{k,l} := \mathrm{if}(M_{k,l} = Geo, l, 0)$ $mphval := \max(Valy)$ $mthval := 5$ $mphval = 15$ $min1_{5,15} = -6.858075085 \cdot 10^{-5}$ $min2_{5,15} = -4.232562787 \cdot 10^{-6}1$ $M_{5,15} = 7.281331364 \cdot 10^{-5}$ $geolat := mthval \cdot deltatheta + latstart$ $geolon := mphval \cdot deltaphi + longstart$ $geolat = 38.8$ $geolon = -77$ This program calculates geolocation from four satellites using the measured Doppler shifts at the satellites and an initial estimate of the location. It is directly analogous to the GPS approach. This mod replaces measured values in a matrix with calculated values and is identical to the original DPS program (Aug. 31, 1997).

$freq0 := 240.50 \cdot 10^6$ $lat := 38.8$ $lon := -77.0$ $omegaEarth := 0.0 \quad oE := 7.29 \cdot 10^{-5}$ $timesec := 0$ $timemin := 0$ $timehour := 0$ $time := timehour \cdot 3600 + timemin \cdot 60 + timesec$ $SatPosVect1 := \begin{pmatrix} 0 \\ 0 \\ 7028 \end{pmatrix} \quad SatPosVect2 := \begin{pmatrix} 0.0 \\ 4969.5465 \\ 4969.5465 \end{pmatrix} \quad SatPosVect3 := \begin{pmatrix} 0.0 \\ -4969.5465 \\ 4969.5465 \end{pmatrix} \quad SatPosVect4 := \begin{pmatrix} 4969.5465 \\ 0.0 \\ 4969.5465 \end{pmatrix}$ $SatVelVect1 := \begin{pmatrix} 0 \\ 7.2 \\ 0 \end{pmatrix} \quad SatVelVect2 := \begin{pmatrix} 0 \\ 5.0911688 \\ -5.0911688 \end{pmatrix} \quad SatVelVect3 := \begin{pmatrix} 0 \\ 5.0911688 \\ 5.0911688 \end{pmatrix} \quad SatVelVect4 := \begin{pmatrix} 5.0911688 \\ 0.0 \\ -5.0911688 \end{pmatrix}$ $c := 2.997930 \cdot 10^5$ $RadiusEarth := 6378$ $alt := 0.1$ $xvec := \begin{pmatrix} 1 \\ 0 \\ 0 \end{pmatrix}$ $yvec := \begin{pmatrix} 0 \\ 1 \\ 0 \end{pmatrix}$ $zvec := \begin{pmatrix} 0 \\ 0 \\ 1 \end{pmatrix}$ $rho := RadiusEarth + alt$ $phi := lon \cdot \dfrac{\pi}{180} + time \cdot omegaEarth \quad time \cdot omegaEarth = 0$ $theta := \dfrac{(90.000 - lat)}{90.000} \cdot \dfrac{\pi}{2} \qquad phi = -1.344$ $RotMat := \begin{pmatrix} rho \cdot \sin(theta) \cdot \cos(phi) & 0 & 0 \\ 0 & rho \cdot \sin(theta) \cdot \sin(phi) & 0 \\ 0 & 0 & rho \cdot \cos(theta) \end{pmatrix}$ $X := RotMat \cdot xvec$ $Y := RotMat \cdot yvec$ $Z := RotMat \cdot zvec$ $X = \begin{pmatrix} 1.118163188 \cdot 10^3 \\ 0 \\ 0 \end{pmatrix}$ $Y = \begin{pmatrix} 0 \\ -4.843296871 \cdot 10^3 \\ 0 \end{pmatrix}$ $Z = \begin{pmatrix} 0 \\ 0 \\ 3.996541769 \cdot 10^3 \end{pmatrix}$ $XP := \begin{pmatrix} X_0 \\ Y_1 \\ Z_2 \end{pmatrix}$ -continued $Ve := XP \times zvec \cdot (omegaEarth)$  $\quad fm1 := 2.40504804885 \cdot 10^8$ $Vt1 := Ve + SatVelVect1$  $\quad fm2 := 2.40503637992 \cdot 10^8$ $Vt2 := Ve + SatVelVect2$  $\quad fm3 := 2.405023247783 \cdot 10^8$ $Vt3 := Ve + SatVelVect3$  $\quad fm4 := 2.405018767603 \cdot 10^8$ $Vt4 := Ve + SatVelVect4$  $\quad freqdelm1 := \dfrac{fm1 - freq0}{freq0}$ $$freqdelm2 := \dfrac{fm2 - freq0}{freq0}$$

$$freqdelm3 := \dfrac{fm3 - freq0}{freq0}$$

$$freqdelm4 := \dfrac{fm4 - freq0}{freq0}$$

$$D1 := \sqrt{(SatPosVect1_0 - XP_0)^2 + (SatPosVect1_1 - XP_1)^2 + (SatPosVect1_2 - XP_2)^2}$$

$$D2 := \sqrt{(SatPosVect2_0 - XP_0)^2 + (SatPosVect2_1 - XP_1)^2 + (SatPosVect2_2 - XP_2)^2}$$

$$D3 := \sqrt{(SatPosVect3_0 - XP_0)^2 + (SatPosVect3_1 - XP_1)^2 + (SatPosVect3_2 - XP_2)^2}$$

$$D4 := \sqrt{(SatPosVect4_0 - XP_0)^2 + (SatPosVect4_1 - XP_1)^2 + (SatPosVect4_2 - XP_2)^2}$$

$$D1v := \begin{pmatrix} SatPosVect1_0 - XP_0 \\ SatPosVect1_1 - XP_1 \\ SatPosVect1_2 - XP_2 \end{pmatrix} \quad cs1 := \dfrac{D1v \cdot Vt1}{|Vt1| \cdot |D1v|}$$

$$D2v := \begin{pmatrix} SatPosVect2_0 - XP_0 \\ SatPosVect2_1 - XP_1 \\ SatPosVect2_2 - XP_2 \end{pmatrix} \quad cs2 := \dfrac{D2v \cdot Vt2}{|Vt2| \cdot |D2v|}$$

$$D3v := \begin{pmatrix} SatPosVect3_0 - XP_0 \\ SatPosVect3_1 - XP_1 \\ SatPosVect3_2 - XP_2 \end{pmatrix} \quad cs3 := \dfrac{D3v \cdot Vt3}{|Vt3| \cdot |D3v|}$$

$$D4v := \begin{pmatrix} SatPosVect4_0 - XP_0 \\ SatPosVect4_1 - XP_1 \\ SatPosVect4_2 - XP_2 \end{pmatrix} \quad cs4 := \dfrac{D4v \cdot Vt4}{|Vt4| \cdot |D4v|}$$

$$A := \begin{bmatrix} Vt1_0 - |Vt1| \cdot cs1 \cdot \dfrac{D1v_0}{D1} & Vt1_1 - |Vt1| \cdot cs1 \cdot \dfrac{D1v_1}{D1} & Vt1_2 - |Vt1| \cdot cs1 \cdot \dfrac{D1v_2}{D1} & c \cdot D1 \cdot \left( \dfrac{|Vt1| \cdot \dfrac{cs1}{c} + 1}{freq0} \right) \\ Vt2_0 - |Vt2| \cdot cs2 \cdot \dfrac{D2v_0}{D2} & Vt2_1 - |Vt2| \cdot cs2 \cdot \dfrac{D2v_1}{D2} & Vt2_2 - |Vt2| \cdot cs2 \cdot \dfrac{D2v_2}{D2} & c \cdot D2 \cdot \left( \dfrac{|Vt2| \cdot \dfrac{cs2}{c} + 1}{freq0} \right) \\ Vt3_0 - |Vt3| \cdot cs3 \cdot \dfrac{D3v_0}{D3} & Vt3_1 - |Vt3| \cdot cs3 \cdot \dfrac{D3v_1}{D3} & Vt3_2 - |Vt3| \cdot cs3 \cdot \dfrac{D3v_2}{D3} & c \cdot D3 \cdot \left( \dfrac{|Vt3| \cdot \dfrac{cs3}{c} + 1}{freq0} \right) \\ Vt4_0 - |Vt4| \cdot cs4 \cdot \dfrac{D4v_0}{D4} & Vt4_1 - |Vt4| \cdot cs4 \cdot \dfrac{D4v_1}{D4} & Vt4_2 - |Vt4| \cdot cs4 \cdot \dfrac{D4v_2}{D4} & c \cdot D4 \cdot \left( \dfrac{|Vt4| \cdot \dfrac{cs4}{c} + 1}{freq0} \right) \end{bmatrix}$$

$GEOM := (A^T \cdot A)^{-1} \cdot A^T$  $\quad A = \begin{bmatrix} 1.15 & 2.218 & -3.119 & 7.258 \\ 0.511 & 0.607 & -5.536 & 12.371 \\ 2.178 & 5.337 & 3.196 & 1.854 \\ 3.653 & -1.809 & -5.455 & 7.808 \end{bmatrix}$ $L := \begin{bmatrix} D1v \cdot Vt1 - c \cdot D1 \cdot freqdelm1 \\ D2v \cdot Vt2 - c \cdot D2 \cdot freqdelm2 \\ D3v \cdot Vt3 - c \cdot D3 \cdot freqdelm3 \\ D4v \cdot Vt4 - c \cdot D4 \cdot freqdelm4 \end{bmatrix}$  $\quad GEOM = \begin{bmatrix} -0.051 & -0.138 & 0.118 & 0.239 \\ 0.614 & -0.28 & -0.074 & -0.111 \\ -0.774 & 0.399 & 0.283 & 0.019 \\ -0.374 & 0.279 & 0.125 & 0.004 \end{bmatrix}$ $DR := GEOM \cdot L$ $L = \begin{bmatrix} 8.305 \cdot 10^{-4} \\ -5.465 \cdot 10^{-4} \\ -1.141 \cdot 10^{-4} \\ -1.745 \cdot 10^{-4} \end{bmatrix}$ -continued $$DR = \begin{bmatrix} -2.201 \cdot 10^{-5} \\ 6.907 \cdot 10^{-4} \\ -8.966 \cdot 10^{-4} \\ -4.784 \cdot 10^{-4} \end{bmatrix}$$

This program calculates geolocation from two satellites using the measured transit times and Doppler shifts at the satellites and an initial estimate of the location. It is directly analogous to the GPS approach. This mod replaces measured values in a matrix with calculated values and is identical to the original DPS/TDOA program (Sep. 5, 1997).

$freq0 := 240.50 \cdot 10^6$ $lat := 38.9$ $lon := -77.0$ $omegaEarth := 0.0 \qquad oE := 7.29 \cdot 10^{-5}$ $timesec := 0$ $timemin := 0$ $timehour := 0$ $time := timehour \cdot 3600 + timemin \cdot 60 + timesec$ $$SatPosVect1 := \begin{pmatrix} 0 \\ 0 \\ 7028 \end{pmatrix} \quad SatPosVect2 := \begin{pmatrix} 0.0 \\ 4969.5465 \\ 4969.5465 \end{pmatrix} \quad SatPosVect3 := \begin{pmatrix} 0.0 \\ -4969.5465 \\ 4969.5465 \end{pmatrix} \quad SatPosVect4 := \begin{pmatrix} 4969.5465 \\ 0.0 \\ 4969.5465 \end{pmatrix}$$

$$SatVelVect1 := \begin{pmatrix} 0 \\ 7.2 \\ 0 \end{pmatrix} \quad SatVelVect2 := \begin{pmatrix} 0 \\ 5.0911688 \\ -5.0911688 \end{pmatrix} \quad SatVelVect3 := \begin{pmatrix} 0 \\ 5.0911688 \\ 5.0911688 \end{pmatrix} \quad SatVelVect4 := \begin{pmatrix} 5.0911688 \\ 0.0 \\ -5.0911688 \end{pmatrix}$$

$c := 2.997930 \cdot 10^5$ $RadiusEarth := 6378$ $alt := 0.1$ $$xvec := \begin{pmatrix} 1 \\ 0 \\ 0 \end{pmatrix}$$

$$yvec := \begin{pmatrix} 0 \\ 1 \\ 0 \end{pmatrix}$$

-continued $$zvec := \begin{pmatrix} 0 \\ 0 \\ 1 \end{pmatrix}$$

$rho := RadiusEarth + alt$ $phi := lon \cdot \dfrac{\pi}{180} + time \cdot omegaEarth \qquad time \cdot omegaEarth = 0$ $theta := \dfrac{(90.000 - lat)}{90.000} \cdot \dfrac{\pi}{2} \qquad phi = -1.344$ $$RotMat := \begin{pmatrix} rho \cdot \sin(theta) \cdot \cos(phi) & 0 & 0 \\ 0 & rho \cdot \sin(theta) \cdot \sin(phi) & 0 \\ 0 & 0 & rho \cdot \cos(theta) \end{pmatrix}$$

$X := RotMat \cdot xvec$ $Y := RotMat \cdot yvec$ $Z := RotMat \cdot zvec$ $$X = \begin{pmatrix} 1.116592389 \cdot 10^3 \\ 0 \\ 0 \end{pmatrix}$$

$$Y = \begin{pmatrix} 0 \\ -4.836492993 \cdot 10^3 \\ 0 \end{pmatrix}$$

$$Z = \begin{pmatrix} 0 \\ 0 \\ 4.005211178 \cdot 10^3 \end{pmatrix}$$

$$XP := \begin{pmatrix} X_0 \\ Y_1 \\ Z_2 \end{pmatrix}$$

$Ve := XP \times zvec \cdot (omegaEarth) \qquad fm1 := 2.40504804885 \cdot 10^8$ $Vt1 := Ve + SatVelVect1 \qquad fm2 := 2.40503637992 \cdot 10^8$ $Vt2 := Ve + SatVelVect2 \qquad fm3 := 2.405023247783 \cdot 10^8$ $Vt3 := Ve + SatVelVect3 \qquad fm4 := 2.405018767603 \cdot 10^8$ $Vt4 := Ve + SatVelVect4 \qquad freqdelm1 := \dfrac{fm1 - freq0}{freq0}$ $\qquad\qquad\qquad\qquad\qquad\qquad freqdelm2 := \dfrac{fm2 - freq0}{freq0}$ $\qquad\qquad\qquad\qquad\qquad\qquad freqdelm3 := \dfrac{fm3 - freq0}{freq0}$ $\qquad\qquad\qquad\qquad\qquad\qquad freqdelm4 := \dfrac{fm4 - freq0}{freq0}$ $D1 := \sqrt{(SatPosVect1_0 - XP_0)^2 + (SatPosVect1_1 - XP_1)^2 + (SatPosVect1_2 - XP_2)^2}$ -continued $$D2 := \sqrt{(SatPosVect2_0 - XP_0)^2 + (SatPosVect2_1 - XP_1)^2 + (SatPosVect2_2 - XP_2)^2}$$

$$D3 := \sqrt{(SatPosVect3_0 - XP_0)^2 + (SatPosVect3_1 - XP_1)^2 + (SatPosVect3_2 - XP_2)^2}$$

$$D4 := \sqrt{(SatPosVect4_0 - XP_0)^2 + (SatPosVect4_1 - XP_1)^2 + (SatPosVect4_2 - XP_2)^2}$$

$$D1v := \begin{pmatrix} SatPosVect1_0 - XP_0 \\ SatPosVect1_1 - XP_1 \\ SatPosVect1_2 - XP_2 \end{pmatrix} \quad cs1 := \frac{D1v \cdot Vt1}{|Vt1| \cdot |D1v|} \quad t1 := 0.019420602$$

$$D2v := \begin{pmatrix} SatPosVect2_0 - XP_0 \\ SatPosVect2_1 - XP_1 \\ SatPosVect2_2 - XP_2 \end{pmatrix} \quad cs2 := \frac{D2v \cdot Vt2}{|Vt2| \cdot |D2v|} \quad t2 := 0.03310337$$

$$D3v := \begin{pmatrix} SatPosVect3_0 - XP_0 \\ SatPosVect3_1 - XP_1 \\ SatPosVect3_2 - XP_2 \end{pmatrix} \quad cs3 := \frac{D3v \cdot Vt3}{|Vt3| \cdot |D3v|} \quad cs1 = 0.832$$

$$D4v := \begin{pmatrix} SatPosVect4_0 - XP_0 \\ SatPosVect4_1 - XP_1 \\ SatPosVect4_2 - XP_2 \end{pmatrix} \quad cs4 := \frac{D4v \cdot Vt4}{|Vt4| \cdot |D4v|} \quad cs2 = 0.63$$

$$A := \begin{bmatrix} \frac{D1v_0}{|D1v|} & \frac{D1v_1}{|D1v|} & \frac{D1v_2}{|D1v|} & 1 \cdot \frac{c}{freq0^2} \\ \frac{D2v_0}{|D2v|} - \frac{D1v_0}{|D1v|} & \frac{D2v_1}{|D2v|} - \frac{D1v_1}{|D1v|} & \frac{D2v_2}{|D2v|} - \frac{D1v_2}{|D1v|} & -1 \cdot \frac{c}{freq0^2} \\ Vt1_0 - |Vt1| \cdot cs1 \cdot \frac{D1v_0}{D1} & Vt1_1 - |Vt1| \cdot cs1 \cdot \frac{D1v_1}{D1} & Vt1_2 - |Vt1| \cdot cs1 \cdot \frac{D1v_2}{D1} & c \cdot D1 \cdot \left( \frac{|Vt1| \cdot \frac{cs1}{c} + 1}{freq0} \right) \\ Vt2_0 - |Vt2| \cdot cs2 \cdot \frac{D2v_0}{D2} & Vt2_1 - |Vt2| \cdot cs2 \cdot \frac{D2v_1}{D2} & Vt2_2 - |Vt2| \cdot cs2 \cdot \frac{D2v_2}{D2} & c \cdot D2 \cdot \left( \frac{|Vt2| \cdot \frac{cs2}{c} + 1}{freq0} \right) \end{bmatrix}$$

$$A = \begin{bmatrix} -0.192 & 0.832 & 0.52 & 5.183 \cdot 10^{-12} \\ 0.08 & 0.157 & -0.423 & -5.183 \cdot 10^{-12} \\ 1.151 & 2.214 & -3.116 & 7.245 \\ 0.511 & 0.602 & -5.533 & 12.361 \end{bmatrix}$$

$$GEOM := (A^T \cdot A)^{-1} \cdot A^T$$

$$L := \begin{bmatrix} |D1v| - t1 \cdot c \\ |D2v| - |D1v| - (t2 - t1) \cdot c \\ D1v \cdot Vt1 - c \cdot D1 \cdot freqdelm1 \\ D2v \cdot Vt2 - c \cdot D2 \cdot freqdelm2 \end{bmatrix}$$

$$GEOM = \begin{bmatrix} -1.771 & -1.895 & 0.952 & -0.558 \\ 0.813 & 1.026 & 0.088 & -0.051 \\ -0.032 & -2.341 & 0.211 & -0.124 \\ 0.019 & -1.019 & 0.051 & 0.051 \end{bmatrix}$$

$$DR := GEOM \cdot L$$

$$L = \begin{bmatrix} -10.474 \\ 2.723 \\ 13.749 \\ 44.649 \end{bmatrix}$$

$$DR = \begin{bmatrix} 1.573 \\ -6.807 \\ -8.666 \\ 1.231 \cdot 10^{-4} \end{bmatrix}$$

This program calculates geolocation from four satellites using the time difference of arrival (TDOA) at the satellites and an initial estimate of the location. It is necesary to correct for atmospheric effects in the same manner as GPS. It assumes an "inaccurate" clock signal is transmitted by the beacon, which is corrected via the algorithm technique. It is directly analogous to the GPS approach (Sep. 1, 1997).

$$freq0 := 240.50 \cdot 10^6$$

$$lat := 38.8$$

$$lon := -77.0$$

$$omegaEarth := 0.0 \qquad oE := 7.29 \cdot 10^{-5}$$

$$timesec := 0$$

$$timemin := 0$$

$$timehour := 0$$

$$time := timehour \cdot 3600 + timemin \cdot 60 + timesec$$

$$SatPosVect1 := \begin{pmatrix} 0 \\ 0 \\ 7028 \end{pmatrix} \quad SatPosVect2 := \begin{pmatrix} 0.0 \\ 4969.5465 \\ 4969.5465 \end{pmatrix} \quad SatPosVect3 := \begin{pmatrix} 0.0 \\ -4969.5465 \\ 4969.5465 \end{pmatrix} \quad SatPosVect4 := \begin{pmatrix} 4969.5465 \\ 0.0 \\ 4969.5465 \end{pmatrix}$$

$$SatVelVect1 := \begin{pmatrix} 0 \\ 7.2 \\ 0 \end{pmatrix} \quad SatVelVect2 := \begin{pmatrix} 0 \\ 5.0911688 \\ -5.0911688 \end{pmatrix} \quad SatVelVect3 := \begin{pmatrix} 0 \\ 5.0911688 \\ 5.0911688 \end{pmatrix} \quad SatVelVect4 := \begin{pmatrix} 5.0911688 \\ 0.0 \\ -5.0911688 \end{pmatrix}$$

$$c := 2.997930 \cdot 10^5$$

$$RadiusEarth := 6378$$

$$alt := 0.1$$

$$xvec := \begin{pmatrix} 1 \\ 0 \\ 0 \end{pmatrix}$$

$$yvec := \begin{pmatrix} 0 \\ 1 \\ 0 \end{pmatrix}$$

$$zvec := \begin{pmatrix} 0 \\ 0 \\ 1 \end{pmatrix}$$

$$rho := RadiusEarth + alt$$

-continued $$phi := lon \cdot \frac{\pi}{180} + time \cdot omegaEarth \qquad time \cdot omegaEarth = 0$$

$$theta := \frac{(90.000 - lat)}{90.000} \cdot \frac{\pi}{2} \qquad phi = -1.344$$

$$RotMat := \begin{pmatrix} rho \cdot \sin(theta) \cdot \cos(phi) & 0 & 0 \\ 0 & rho \cdot \sin(theta) \cdot \sin(phi) & 0 \\ 0 & 0 & rho \cdot \cos(theta) \end{pmatrix}$$

$X := RotMat \cdot xvec$ $Y := RotMat \cdot yvec$ $Z := RotMat \cdot zvec$ $$X = \begin{pmatrix} 1.118163188 \cdot 10^3 \\ 0 \\ 0 \end{pmatrix}$$

$$Y = \begin{pmatrix} 0 \\ -4.843296871 \cdot 10^3 \\ 0 \end{pmatrix}$$

$$Z = \begin{pmatrix} 0 \\ 0 \\ 3.996541769 \cdot 10^3 \end{pmatrix}$$

$$XP := \begin{pmatrix} X_0 \\ Y_1 \\ Z_2 \end{pmatrix}$$

$Ve := XP \times zvec \cdot (omegaEarth)$  $\qquad fm1 := 2.40504804885 \cdot 10^8$ $Vt1 := Ve + SatVelVect1$  $\qquad fm2 := 2.40503637992 \cdot 10^8$ $Vt2 := Ve + SatVelVect2$  $\qquad fm3 := 2.405023247783 \cdot 10^8$ $Vt3 := Ve + SatVelVect3$  $\qquad fm4 := 2.405018767603 \cdot 10^8$ $Vt4 := Ve + SatVelVect4$  $\qquad freqdelm1 := \dfrac{fm1 - freq0}{freq0}$ $\qquad\qquad\qquad\qquad\qquad freqdelm2 := \dfrac{fm2 - freq0}{freq0}$ $\qquad\qquad\qquad\qquad\qquad freqdelm3 := \dfrac{fm3 - freq0}{freq0}$ $\qquad\qquad\qquad\qquad\qquad freqdelm4 := \dfrac{fm4 - freq0}{freq0}$ $D1 := \sqrt{(SatPosVect1_0 - XP_0)^2 + (SatPosVect1_1 - XP_1)^2 + (SatPosVect1_2 - XP_2)^2}$ $D2 := \sqrt{(SatPosVect2_0 - XP_0)^2 + (SatPosVect2_1 - XP_1)^2 + (SatPosVect2_2 - XP_2)^2}$ $D3 := \sqrt{(SatPosVect3_0 - XP_0)^2 + (SatPosVect3_1 - XP_1)^2 + (SatPosVect3_2 - XP_2)^2}$ $D4 := \sqrt{(SatPosVect4_0 - XP_0)^2 + (SatPosVect4_1 - XP_1)^2 + (SatPosVect4_2 - XP_2)^2}$ $$D1v := \begin{pmatrix} SatPosVect1_0 - XP_0 \\ SatPosVect1_1 - XP_1 \\ SatPosVect1_2 - XP_2 \end{pmatrix}$$

$$D2v := \begin{pmatrix} SatPosVect2_0 - XP_0 \\ SatPosVect2_1 - XP_1 \\ SatPosVect2_2 - XP_2 \end{pmatrix}$$

$$D3v := \begin{pmatrix} SatPosVect3_0 - XP_0 \\ SatPosVect3_1 - XP_1 \\ SatPosVect3_2 - XP_2 \end{pmatrix}$$

-continued $$D4v := \begin{pmatrix} SatPosVect4_0 - XP_0 \\ SatPosVect4_1 - XP_1 \\ SatPosVect4_2 - XP_2 \end{pmatrix}$$

$$t11 := \frac{|D1v|}{c} \quad t22 := \frac{|D2v|}{c} \quad t33 := \frac{|D3v|}{c} \quad t44 := \frac{|D4v|}{c}$$

$$t1 := 0.019420602 \quad t2 := 0.033103370 \quad t3 := 0.004962104 \quad t4 := 0.020894343$$

$$A := \begin{bmatrix} \frac{D1v_0}{|D1v|} & \frac{D1v_1}{|D1v|} & \frac{D1v_2}{|D1v|} & 1 \cdot c \\ \frac{D2v_0}{|D2v|} - \frac{D1v_0}{|D1v|} & \frac{D2v_1}{|D2v|} - \frac{D1v_1}{|D1v|} & \frac{D2v_2}{|D2v|} - \frac{D1v_2}{|D1v|} & -1 \cdot c \\ \frac{D3v_0}{|D3v|} - \frac{D1v_0}{|D1v|} & \frac{D3v_1}{|D3v|} - \frac{D1v_1}{|D1v|} & \frac{D3v_2}{|D3v|} - \frac{D1v_2}{|D1v|} & -1 \cdot c \\ \frac{D4v_0}{|D4v|} - \frac{D1v_0}{|D1v|} & \frac{D4v_1}{|D4v|} - \frac{D1v_1}{|D1v|} & \frac{D4v_2}{|D4v|} - \frac{D1v_2}{|D1v|} & -1 \cdot c \end{bmatrix}$$

$$GEOM := (A^T \cdot A)^{-1} \cdot A^T$$

$$A = \begin{bmatrix} -0.192 & 0.832 & 0.521 & 2.998 \cdot 10^5 \\ 0.079 & 0.157 & -0.423 & -2.998 \cdot 10^5 \\ -0.56 & -0.917 & 0.133 & -2.998 \cdot 10^5 \\ 0.807 & -0.059 & -0.365 & -2.998 \cdot 10^5 \end{bmatrix}$$

$$L := \begin{bmatrix} |D1v| - c \cdot t1 \\ |D2v| - |D1v| - (t2 - t1) \cdot c \\ |D3v| - |D1v| - (t3 - t1) \cdot c \\ |D4v| - |D1v| - (t4 - t1) \cdot c \end{bmatrix}$$

$$GEOM = \begin{bmatrix} 0.112 & -0.998 & -0.15 & 1.26 \\ 0.849 & 0.998 & -0.15 & 0 \\ 1.768 & -1.018 & 1.337 & 1.449 \\ -2.019 \cdot 10^{-6} & -1.642 \cdot 10^{-6} & -2.003 \cdot 10^{-6} & -1.708 \cdot 10^{-6} \end{bmatrix}$$

$$DR := GEOM \cdot L$$

$$L = \begin{bmatrix} -6.858 \cdot 10^{-5} \\ -2.304 \cdot 10^{-5} \\ 1.681 \cdot 10^{-4} \\ -3.593 \cdot 10^{-5} \end{bmatrix}$$

$$DR = \begin{bmatrix} -5.515 \cdot 10^{-5} \\ -1.064 \cdot 10^{-4} \\ 7.497 \cdot 10^{-5} \\ -9.911 \cdot 10^{-11} \end{bmatrix}$$

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A micro-miniature personal emergency geo-location transmitter unit beacon system of size less than 70 cubic centimeters comprising:

antenna means for radiation transmission or emission to provide intermittent single burst coded signals for geo-location purposes, said coded signals including data indicating the identity of a user of said transmitter unit beacon system, said antenna means providing power densities at locations of one or more nodes of satellite or ground communication networks sufficient for said coded signals to be detected for the purpose of determining the location of said beacon;

energy means to supply power to said transmitter unit beacon system and to provide broadcast power of at least five watts average to allow detection of a transmitted beacon system signal by said satellite or ground communication networks, said energy means comprising miniaturized batteries of at least 50 watt-hour per pound capacity;

communications processing means, comprising a local oscillator or radiation source, modulation circuitry receiving a carrier signal from said source, an amplifier receiving the modulated carrier signal from said modulation circuitry, and said antenna with impedance-matching circuitry receiving said modulated carrier signal from said amplifier to radiate a modulated carrier coded signal for geo-location containing the identity of said user of said beacon;

a central processor unit (CPU) means to control activation, operation and test of said beacon and provide transfer of said user identification data to said communications processing means;

satellite or ground communication networks means, comprising networks nodes solely for cellular telephone or wireless data communications applications, to detect said beacon system coded signals by acquiring the same single burst transmission from said transmitter unit beacon at a multiplicity of said satellite or ground site communication networks nodes within line of sight of said beacon system, and route said beacon system coded signals to an operations center;

an operations center, comprising means to determine a location of said beacon system from said single burst coded signals detected by said multiplicity of satellites or ground sites, including least squares minimization matrix methods, and means to track and report the location of said beacons that are activated.

2. A device according to claim 1 wherein said beacon system is activated by voice, mechanical, electromagnetic, or automatic timing circuitry means.

3. A device according to claim 1 wherein said ground communications network means are cellular telephone networks or RF/radio wireless data networks, which include mobile nodes to improve coverage, in addition to conventional wireless RF antenna towers or cell phone site ground structures.

4. A device according to claim 1 wherein said antenna means for said radiation transmission or emission include dipole, monopole, loop, patch, array or omni-directional antennas of fractional wavelength dimensions for compact construction, including configurations with back-plane geometries to increase range.

5. A device according to claim 1 wherein micro-miniature is defined as a device of physical dimensions of the order of 70 cubic centimeters or less and is easily concealed in clothing or disguised as a wristwatch or jewelry.

6. A device according to claim 1 wherein said satellite communication networks means to detect said single burst coded signals and said operations center to determine its location comprise the following techniques for using Doppler shifts from multiple receiving node locations using said satellite communication networks, said techniques including;

use of least squares minimization matrix methods, applied to Doppler conical equations.

7. A device according to claim 1 wherein said satellite or ground communication networks means to detect said single burst coded signals and said operations center to determine its location comprise the following forms of triangulation techniques using said satellite or ground communications networks multiple receiving node locations, said triangulation techniques including;

use of pseudo-random beacon signals and least squares minimization matrix methods applied to spherical equations for geo-location, or;

use of pseudo-random beacon signals and least squares minimization matrix methods applied to hyperboloidal equations for geo-location.

8. A device according to claim 1 wherein said satellite or ground communication networks are replaced by networks which more precisely record said single burst coded signals, including Doppler shifts and signal reception time, for more accurate geo-location.

9. A device according to claim 1 wherein said satellite or ground communication networks means to detect said single burst coded signals and said operations center to determine its location comprise the following forms of triangulation and Doppler shift techniques using said satellite communication networks multiple receiving node locations to determine said beacon location with use of fewer network nodes, said triangulation techniques including;

use of pseudo-random beacon signals and least squares minimization matrix methods applied to spherical equations for geo-location, or;

use of pseudo-random beacon signals and least squares minimization matrix methods applied to hyperboloidal equations for geo-location, wherein;

one of these triangulation techniques is used in combination with a Doppler technique, including;

use of least squares minimization matrix methods, applied to Doppler conical equations.

10. A device according to claim 1 wherein said beacon system emits radiation in the visible or IR spectrum, and said satellite or ground communications networks are replaced with satellite or airborne visible or IR detection systems, including gradient index lenses or telescopes designed for isotropic radiation patterns.

* * * * *